No. 864,324. PATENTED AUG. 27, 1907.
C. E. MOXLEY.
HOLDBACK.
APPLICATION FILED APR. 23, 1906.
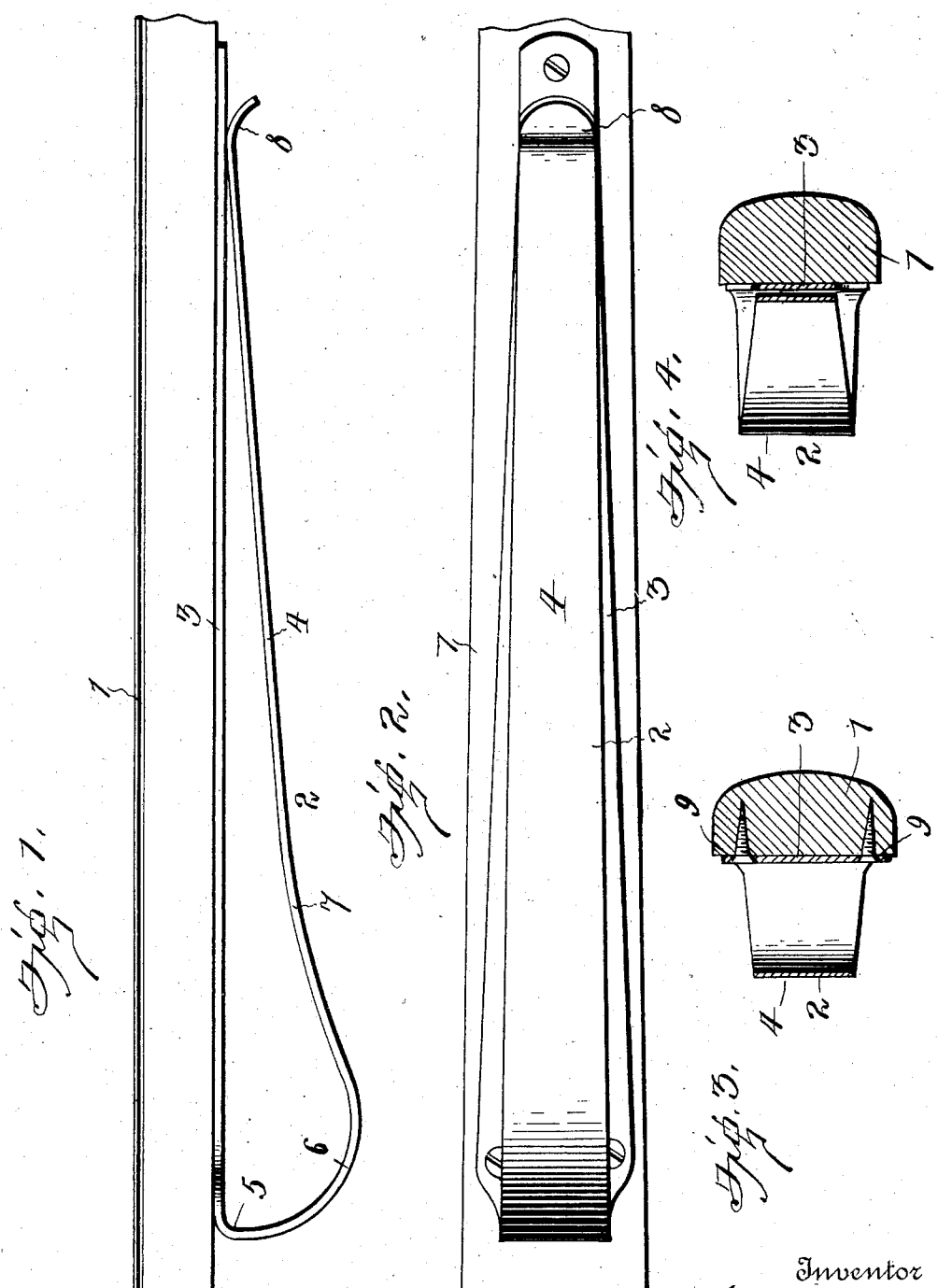
Inventor
C. E. Moxley.
by H. B. Willson & Co.
Attorneys
Witnesses

UNITED STATES PATENT OFFICE.

CHARLES E. MOXLEY, OF HALLSTEAD, PENNSYLVANIA.

HOLDBACK.

No. 864,324.          Specification of Letters Patent.          Patented Aug. 27, 1907.

Application filed April 23, 1906. Serial No. 313,303.

*To all whom it may concern:*

Be it known that I, CHARLES E. MOXLEY, a citizen of the United States, residing at Hallstead, in the county of Susquehanna and State of Pennsylvania, have invented certain new and useful Improvements in Holdbacks; and I do declare the following to be a full, clear, and exact description of the invention, such as will enable others skilled in the art to which it appertains to make and use the same.

My invention relates to improvements in holdbacks for use on vehicle shafts, and its object is to provide a simple, durable and comparatively inexpensive device of this character, with which the holdback strap may be readily engaged when hitching the animal to the shafts, and from which it will be automatically released in unhitching the animal or when the animal runs away.

With the above and other objects in view, the invention consists of certain novel features of construction, combination and arrangement of parts hereinafter described and claimed.

In the accompanying drawings:—Figure 1 is a side elevation of a portion of a shaft, showing the application of my improved holdback thereto; Fig. 2 is a bottom plan view of the same; and Figs. 3 and 4 are transverse sectional views.

Referring to the drawings by numeral, 1 denotes a portion of one of the shafts of a vehicle of any description, and 2 denotes my improved holdback which is secured upon the flat under side or bottom of the shaft 1. This holdback is formed from a single plate or strip of resilient sheet metal, which is shaped to provide a longitudinally tapering base 3 and a long resilient hook or spring tongue 4. The latter springs from the enlarged end of the base 3 at 5 where an angular strap receiving crotch is formed, and thence it is reduced and is formed by bending this reduced portion to form a comparatively large, substantially semi-circular loop 6 and a longitudinally curved arm or bill 7, which has its outer end bearing against the smaller end of the base 3 and slightly outturned, as at 8, to facilitate the insertion of a holdback between it and the base-plate. The angular holdback strap receiving crotch is an important feature of the invention inasmuch as the inclined wall 6 always operates to cause the strap to lie close to the shaft, and thereby obviate any tendency of the strap to work out, which might result if the crotch were merely curved as is usual. The resilient tongue or bill 7 serves as a guard to prevent the holdback strap from slipping out of the device, and by making the latter comparatively long, as shown, there will be little or no danger of the holdback strap working forwardly and out of the same. The device is secured upon the flat bottom of the shaft 1, by screws passed through apertures 9 formed in said base-plate at its small forward end and adjacent to its enlarged rear end.

The construction, use and advantages of the invention will be readily understood from the foregoing description taken in connection with the accompanying drawings. It will be noted that, owing to the attachment of the holdback upon the under side of the shaft, it will be entirely out of sight and will not be in the way or interfere with any part of the harness. It permits the animal to be quickly and easily hitched and unhitched, and when, in case of a runaway or other accident the traces are released, it permits the animal to automatically release itself from the shafts, and thus prevent the damage or injury to the vehicle and its occupants which might otherwise result. It dispenses with the use of snaps on the holdbacks and does away with the necessity of extra holdbacks, one pair being sufficient for all vehicles.

Various changes in the form, proportion and the minor details of construction may be resorted to without departing from the principle or sacrificing any of the advantages of the invention, as defined by the appended claims.

Having thus described my invention, what I claim as new and desire to secure by Letters-Patent is:—

The combination with a shaft, of a holdback secured thereto and comprising a strip of resilient metal bent upon itself to provide a flat attaching base, an angular holdback strap receiving crotch, and a guard tongue or arm, the terminal of which bears against the base, substantially as shown and described.

In testimony whereof I have hereunto set my hand in presence of two subscribing witnesses.

CHARLES E. MOXLEY.

Witnesses:
W. H. WINDUS,
A. F. MERRELL.